(12) United States Patent  
Berg et al.

(10) Patent No.: US 7,395,886 B2  
(45) Date of Patent: Jul. 8, 2008

(54) DUAL ROW CART COLLECTOR AND METHOD

(75) Inventors: Jeffrey O. Berg, Medina, MN (US); Joseph D. Berg, Little Falls, MN (US)

(73) Assignee: Gatekeeper Systems (HK) Limited, Hong Kong (HK)

( * ) Notice: Subject to any disclaimer, the term of this patent is extended or adjusted under 35 U.S.C. 154(b) by 490 days.

(21) Appl. No.: 11/216,480

(22) Filed: Aug. 31, 2005

(65) Prior Publication Data

US 2006/0042842 A1 Mar. 2, 2006

Related U.S. Application Data

(60) Provisional application No. 60/615,348, filed on Oct. 4, 2004, provisional application No. 60/611,073, filed on Sep. 20, 2004, provisional application No. 60/605,670, filed on Aug. 31, 2004.

(51) Int. Cl.  
*B62D 51/04* (2006.01)

(52) U.S. Cl. .................. 180/19.2; 280/33.991

(58) Field of Classification Search ............... 180/19.2, 180/11; 280/33.991; D12/14; 414/469  
See application file for complete search history.

(56) References Cited

U.S. PATENT DOCUMENTS

| | | | |
|---|---|---|---|
| 2,751,218 A | 6/1956 | Pass, Jr. ................. | 267/69 |
| 2,879,858 A | 3/1959 | Thomas .................. | 180/19 |
| 5,082,074 A | 1/1992 | Fischer .................. | 180/11 |
| 5,322,306 A | 6/1994 | Coleman ................ | 280/33.992 |
| D355,148 S | 2/1995 | Orsolini ................ | D12/85 |
| 5,439,069 A | 8/1995 | Beeler .................... | 180/11 |
| 5,573,078 A | 11/1996 | Stringer et al. ......... | 180/19.2 |
| 5,791,669 A | 8/1998 | Broddon et al. ........ | 280/47.34 |
| 5,860,485 A | 1/1999 | Ebbenga ................ | 180/19.2 |
| 5,934,694 A | 8/1999 | Schugt et al. .......... | 280/33.991 |
| D413,550 S | 9/1999 | Otterson et al. ........ | D12/1 |
| 6,050,587 A | 4/2000 | Panhausen .............. | 280/480 |
| 6,070,679 A | 6/2000 | Berg et al. ............. | 180/19.2 |
| 6,220,379 B1 | 4/2001 | Schugt et al. .......... | 180/65.1 |
| 6,244,366 B1 | 6/2001 | Otterson et al. ........ | 180/11 |
| 6,260,643 B1 | 7/2001 | Schuchardt ............. | 180/14.1 |
| 6,406,250 B2 | 6/2002 | Jaeger et al. ........... | 414/800 |
| 2003/0080534 A1 | 5/2003 | Freeman ................ | 280/495 |
| 2004/0033127 A1 | 2/2004 | Roseman et al. ....... | 414/608 |
| 2004/0164517 A1 | 8/2004 | Lewy et al. ............ | 280/493 |
| 2006/0197295 A1* | 9/2006 | Holtan et al. .......... | 280/33.991 |

OTHER PUBLICATIONS

U.S. Appl. No. 60/605,670, filed Aug. 31, 2004.  
U.S. Appl. No. 60/611,073, filed Sep. 20, 2004.  
U.S. Appl. No. 60/615,348, filed Oct. 4, 2004.

* cited by examiner

*Primary Examiner*—Tony H. Winner

(57) ABSTRACT

A motorized cart collector for pulling two rows of carts in a forward direction over a surface includes a mobile body having a frame and a cart connector assembly. The cart connector assembly is pivotally connected to a rear end of the frame for pivotal movement about a vertical axis that is approximately perpendicular to the surface. The cart connector assembly includes first and second cart connectors that respectively configured to simultaneously attach to first and second lead carts. Also disclosed is a method of pulling two rows of carts using the cart collector.

29 Claims, 9 Drawing Sheets

DUAL ROW CART COLLECTOR AND METHOD

The present application is based on and claims the benefit of: U.S. provisional patent application Ser. No. 60/605,670, filed Aug. 31, 2004; U.S. provisional patent application Ser. No. 60/611,073, filed Sep. 20, 2004; and U.S. provisional patent application Ser. No. 60/615,348, filed Oct. 4, 2004. The content of each of the above-identified provisional applications is hereby incorporated by reference in its entirety.

FIELD OF THE INVENTION

The present invention generally relates to the collection of carts, such as shopping carts, lumber carts, wheeled pallets and other wheeled or non-wheeled items. More specifically, the present invention relates to a motorized cart collector configured to pull two rows of carts and a method of pulling two rows carts.

BACKGROUND OF THE INVENTION

The process of collecting and moving carts in parking lots is a tedious task. Motorized cart collectors have been developed to assist in the cart collection process. Such cart collectors typically push a single line of nested carts. When the line of nested carts gets long, the operator often must assist the cart collector by pointing the leading carts in the desired direction making maneuvering the line of carts cumbersome. The reduced control of the long line of nested carts increases the likelihood of accidents. Additionally, the long line of nested carts often blocks pedestrian and vehicle traffic leading to customer frustration.

Embodiments of the present invention provide solutions to these and other problems, and offer other advantages over the prior art.

SUMMARY OF THE INVENTION

The present invention is generally directed to a motorized cart collector for pulling two rows of carts in a forward direction over a surface and a method of pulling two rows of carts. The cart collector includes a mobile body having a frame and a cart connector assembly. The cart connector assembly is pivotally connected to a rear end of the frame for pivotal movement about a vertical axis that is approximately perpendicular to the surface. The cart connector assembly includes first and second cart connectors that respectively configured to simultaneously attach to first and second lead carts.

In the method, a motorized cart collector is provided that is configured to pull carts in a forward direction over a surface and includes a mobile body having a frame and a cart connector assembly attached to a rear end of the frame. The cart connector assembly includes first and second cart connectors. The first cart connector is connected to a lead cart of a first row of carts and the second cart connector is connected to a lead cart of a second row of carts. The first and second rows of carts are then pulled with the motorized cart collector.

Other features and benefits that characterize embodiments of the present invention will be apparent upon reading the following detailed description and review of the associated drawings.

DETAILED DESCRIPTION OF THE PREFERRED EMBODIMENTS

The present invention is directed to a cart collector that is configured to pull one or two rows of carts. The ability to pull carts in two rows has several advantages over prior art cart collectors that generally push a single row of carts. One advantage is that the length of the group of carts is cut in half, which reduces pedestrian and vehicle traffic obstruction. Another advantage is that the carts become more maneuverable as the length of a nested chain of carts is reduced. Yet another advantage is that the shorter length of the two row configuration is easier to manage than the long single row configuration.

Figure 1:
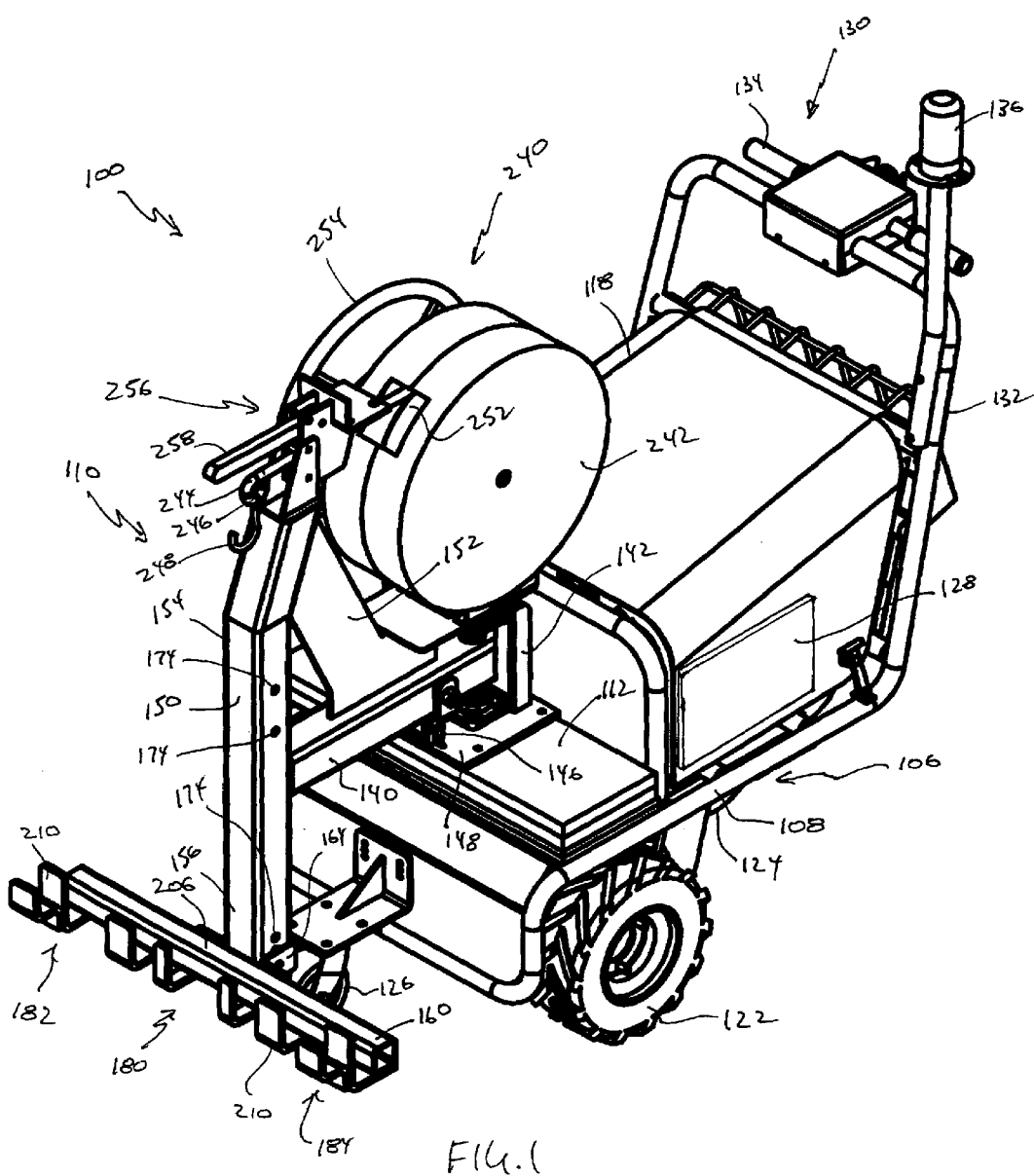
FIG. 1 is a perspective view of a motorized cart collector in accordance with embodiments of the invention.
Figure 2:
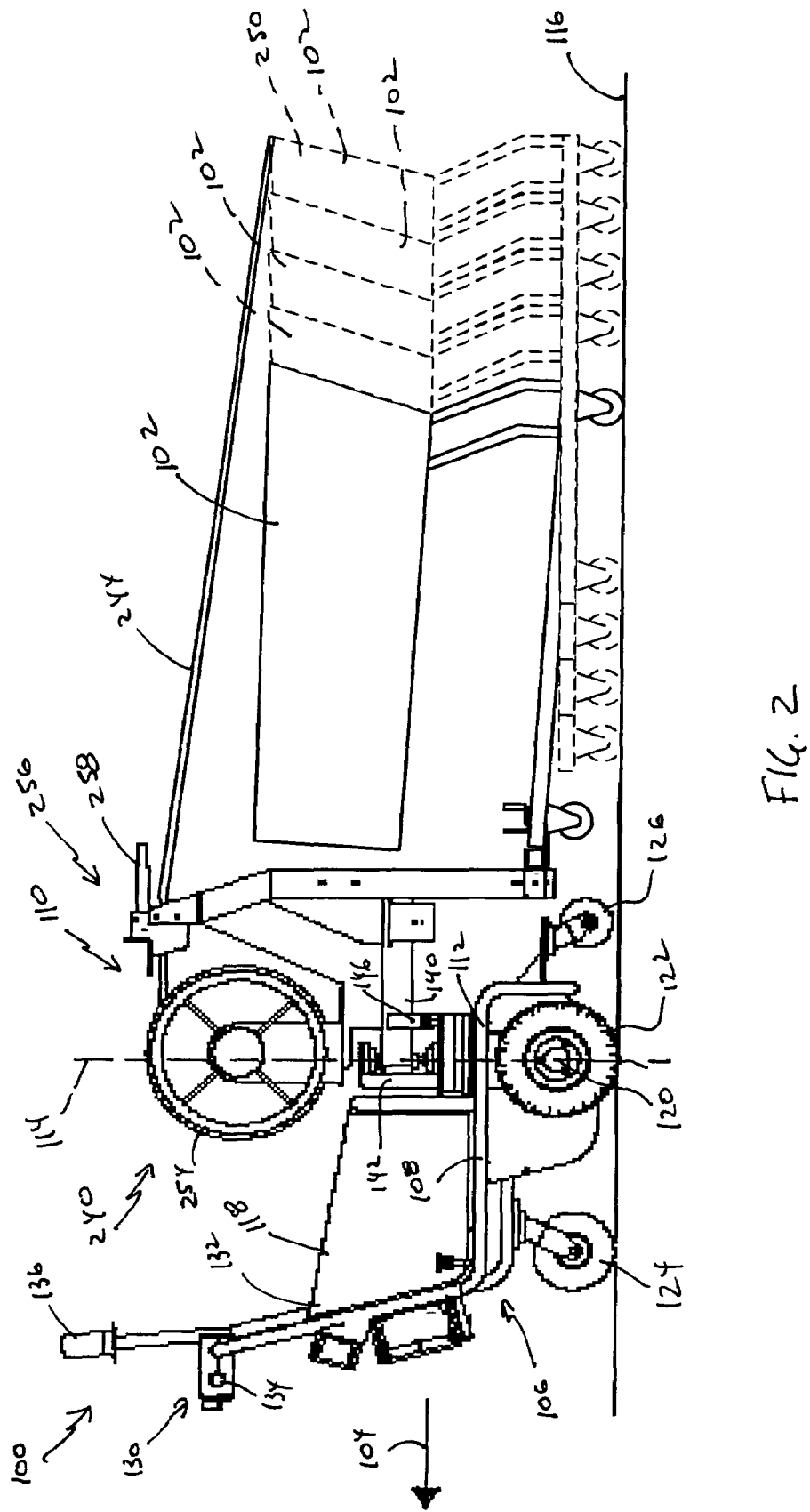
FIGS. 2 and 3 respectively are side and top views of a cart collector pulling two rows of carts in accordance with embodiments of the invention.
Figure 3:
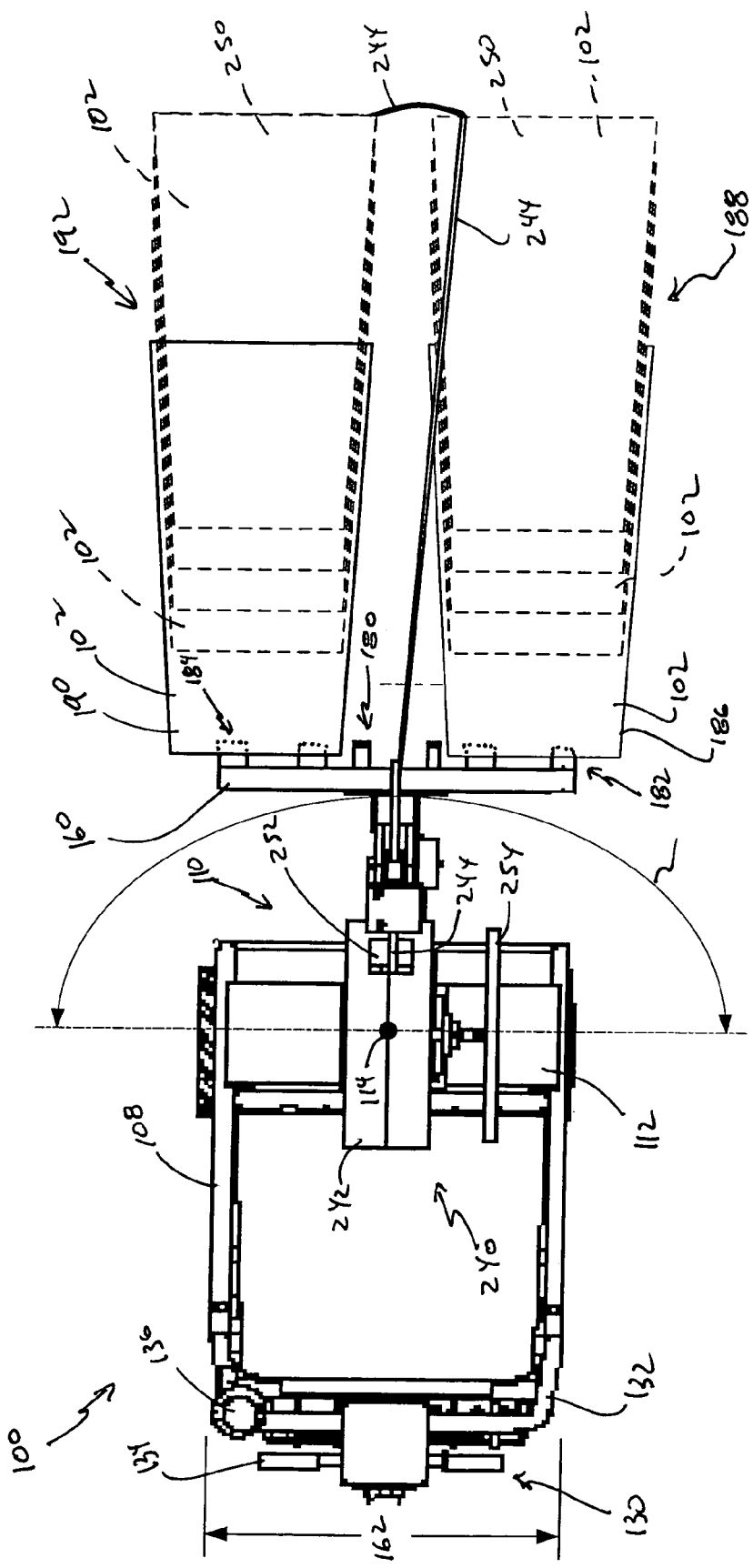

FIG. 1 is a perspective view of a motorized cart collector 100 in accordance with embodiments of the invention. FIGS. 2 and 3 respectively are side and top views of the cart collector 100 pulling two rows of carts 102 in accordance with embodiments of the invention.

In general, the cart collector 100 is configured to pull one or more rows of carts in a forward direction, which is indicated by arrow 104 in FIG. 2. The cart collector 100 generally comprises a mobile body 106 including a frame 108 and a cart connector assembly 110, to which one or more rows of carts 102 can be attached. The cart connector assembly 110 is pivotally connected to a rear end 112 of the frame 108 for pivotal movement about a vertical axis 114 (FIG. 3) that is approximately perpendicular to the surface 116 over which the cart collector 100 travels.

The cart collector 100 also includes a housing 118 that encloses a power supply, such as an electric motor powered by 12V batteries, or a combustible engine, for example. The power supply drives a transaxle 120, which in turn drives the attached wheels 122. A front castor 124 provides support of the frame 108 and allows the cart collector 100 to turn in a desired direction. A rear castor 126 provides additional support of the frame 108. In accordance with one embodiment of the invention, a display 128 including a mount for receiving a printed display or a flat panel monitor is mounted to the housing 118, such as to a side of the housing 118 (as shown) or to a top of the housing 118.

Hand operated controls 130 are provided at the front end 132 of the cart collector 100 to control the speed and direction in which the cart collector 100 is driven. The controls 130 can include steering handles 134, which can also provide forward/reverse control, or other suitable control interface. The controls 130 can also provide control of a flashing safety light 136 and headlights (not shown).

As mentioned above, the cart connector assembly 110 is configured to couple to at least the lead cart 102 of one or two rows of carts 106. The rows of carts that can couple to the cart connector assembly can comprise a single lead cart, such as when the carts 102 are not configured for nesting, multiple non-nested carts that are coupled together by a linking member, or multiple nested carts (FIGS. 2 and 3).

A support member 140 of the cart connector assembly 110 pivotally attaches to a pivot assembly 142 at the rear end 112 of the frame 108 that includes a vertical axle that defines the vertical axis 114. In accordance with one embodiment of the invention, the vertical axis 114 extends through the transaxle 120, as shown in FIG. 2. The cart connector assembly 110 is preferably configured to pivot 180 degrees or more, as indicated by the arc 144 in FIG. 3, and can be locked in a straight rearward position, best shown in FIG. 3, using a pin 146 that is received in a plate 148 mounted to the frame 108, or other suitable method.

The support member 140 generally extends in a rearward direction that is opposite the forward direction 104. A vertical support member 150 is attached (e.g., welded) to the support member 140. A plate 152 is welded to the support members 140 and 150 to reinforce the connection. The vertical support member 150 includes a first end 154 and a second end 156 that is closer to the surface 116 than the first end 154. Although depicted as being substantially perpendicular to the surface 116, the vertical support member 150 can be angled in either the forward direction 104 or the rearward direction.

The cart connector assembly 110 also includes a horizontal support member 160 that is preferably detachably mounted to the vertical support member 150. In accordance with one embodiment of the invention, the horizontal support member 160 spans approximately a width 162 of the frame 108, as shown in FIG. 3.

Figure 4:
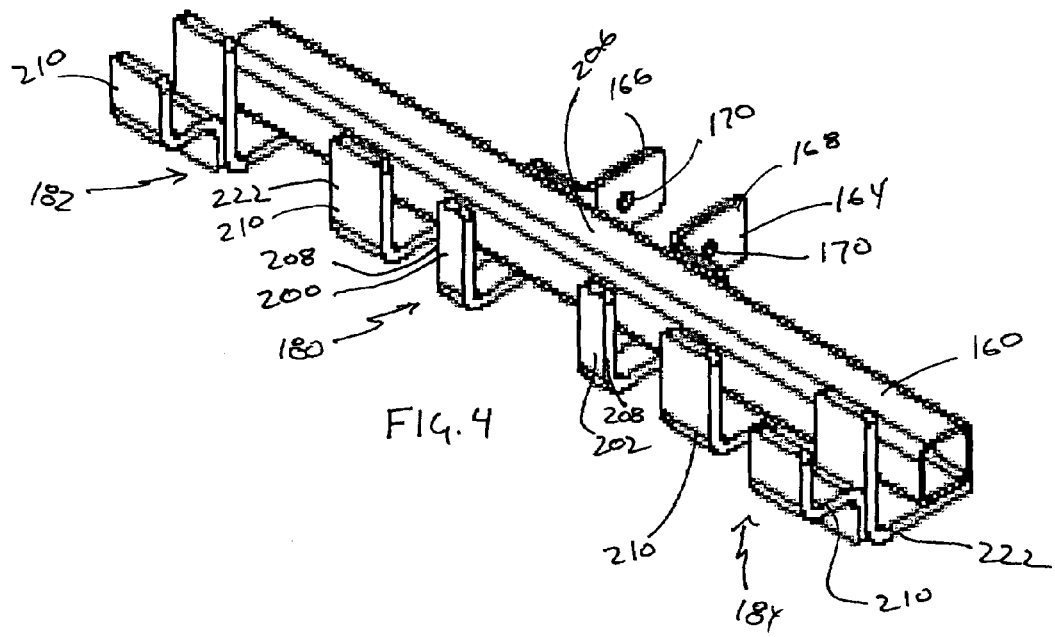
FIGS. 4 and 5 are perspective views of a portion of a cart connector assembly in accordance with various embodiments of the invention.
Figure 5:
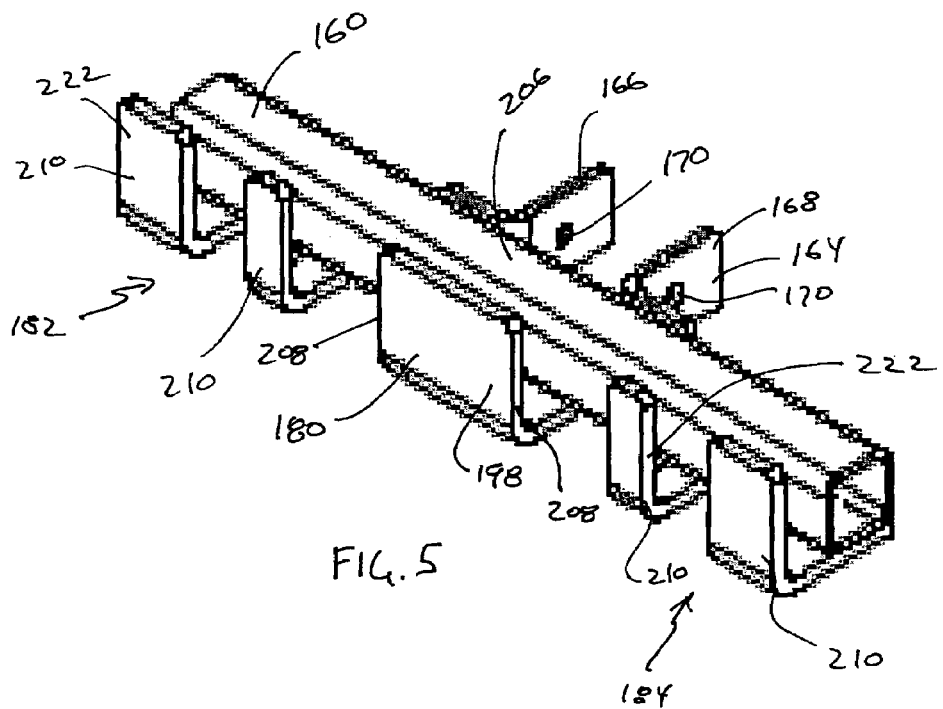
Figure 6:
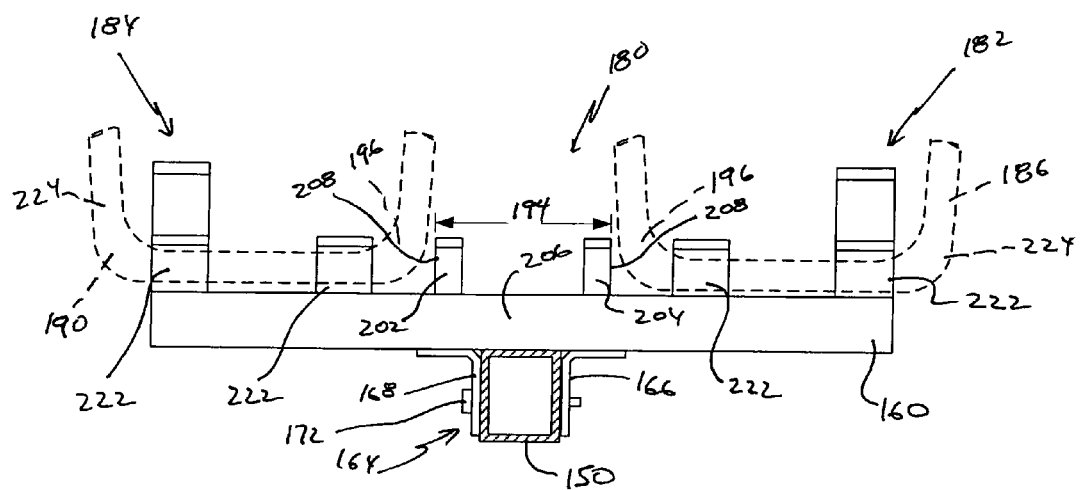
FIG. 6 is a top partial cross-sectional view of a portion of a cart connector assembly coupled to first and second lead carts shown in phantom, in accordance with embodiments of the invention.

FIGS. 4 and 5 are perspective views of the horizontal support member 160 and other components of the cart connector assembly 110 in accordance with various embodiments of the invention. FIG. 6 is a top view of the horizontal support member 160 attached to the vertical support member 150, which is shown in cross-section.

One embodiment of the horizontal support member 160 includes a bracket 164 comprising a pair of plates 166 and 168 each having an aperture 170. Attachment of the horizontal support member 160 to the vertical support member 150 is completed by positioning the bracket 164 around the vertical support member 150 and inserting a pin 172 through the apertures 170 of the bracket 164 and a corresponding aperture 174 of the vertical support member 150, as illustrated in FIG. 6. In accordance with one embodiment of the invention, the vertical support member 150 includes a plurality of apertures 174 for mounting the horizontal support member 160 at a plurality of different vertical locations to facilitate attachment to different types of carts 102. Other methods of detachably mounting the horizontal support member 160 to the vertical support member 150 can also be used.

The cart connector assembly 110 also includes a cart separator 180 and first and second cart connectors 182 and 184, all of which, in accordance with one embodiment of the invention, extend in the rearward direction from the horizontal support member 160. The first and second cart connectors 182 and 184 are attached to the horizontal support member 160 on opposite sides of the cart separator 180. The first cart connector 182 is configured to attach to a lead cart 186 of a first row 188 of carts 102 and the second cart connector 184 is configured to attach to a lead cart 190 of a second row 192 of carts 102, as illustrated in FIGS. 3 and 6.

The cart separator 180 is configured to maintain at least a cart separating distance 194 between leading portions 196 of the lead carts 186 and 188, as shown in FIG. 6, which improves the maneuverability of the carts 102. If one were to attempt to pull two rows of carts without the cart separator 180 maintaining the cart separating distance 194 between them, the carts 102 can bind making turning difficult. The cart separating distance 194 is preferably greater than approximately 3 inches. In accordance with one embodiment of the invention, the cart separating distance 194 is 4 inches.

The cart separator 180 can include a single cart separating member 198, as shown in FIG. 5, or multiple cart separating members, such as first and second cart separating members 200 and 202, as shown in FIGS. 1, 3, 4 and 6. The cart separating member 198 or members 200 and 202 extend in the rearward direction from a middle portion 206 of the horizontal support member 160 and define outside edges 208 that are positioned to engage sides of the lead carts 186 and 190 and define the cart separating distance 194. One embodiment of the cart separating member 198 or members 200 and 202 includes a J-shaped hook, which can be used to couple to a lead cart when only a single row of carts is being pulled by the cart collector 100.

The cart connectors 182 and 184 generally include one or more hooks or brackets 210 that attach to the leading portion 196 of the lead carts 186 and 190, as shown in FIG. 6. In accordance with one embodiment of the invention, the first and second cart connectors 182 and 184 are fixed (e.g., welded) to the horizontal support member 160, as illustrated in FIGS. 4-6. In accordance with this embodiment of the invention, the horizontal support member 160 with the attached first and second cart connectors 182 and 184 is preferably customized to the particular carts 102 to be pulled. As a result, the first and second cart connectors 182 and 184 can each include multiple hooks and/or brackets 210 to facilitate attachment to different types of carts 102 where some of the hooks or brackets 210 are used to attach the cart connector assembly 110 to one type of cart 102, while another group of the hooks or brackets 210 are used to attach the cart connector assembly 110 to another type of cart 102.

Alternatively, the first and/or second cart connector 182 and 184 can be adjustably mounted to the horizontal support member 160. This allows the cart connectors 182 and 184 to be positioned at a desired location along the horizontal support member 160 between the cart separator 180 and the respective end of the horizontal support member 160. Top and side views of an exemplary cart connector 212 in accordance with this embodiment of the invention are respectively provided in FIGS. 7 and 8. The adjustable cart connector 212 includes a sleeve member 214 that receives the horizontal support member 160, which is shown in cross-section in FIG. 8. Although depicted as completely surrounding the horizontal support member 160, the sleeve member 214 could be configured with an open side to simplify installation on the horizontal support member 160 and position adjustment. The sleeve member 214 is fixed in position relative to the horizontal support member 160 by inserting a pin 216 through apertures 218 of the sleeve member 214 and a corresponding aperture 220 of the horizontal support member 160. Preferably, the horizontal support member 160 includes a plurality of apertures 220 to accommodate several position locations for the cart connector 212.

Figure 7:
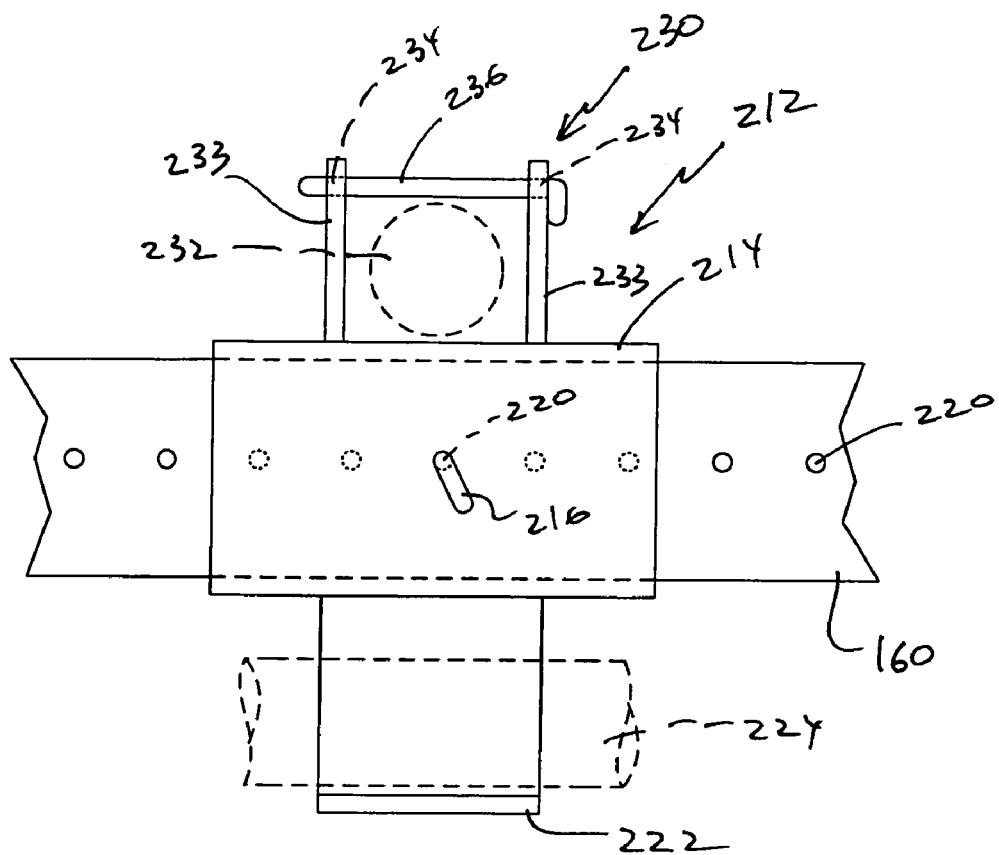
FIGS. 7 and 8 respectively are top and side views of an adjustable cart connector in accordance with embodiments of the invention.
Figure 8:
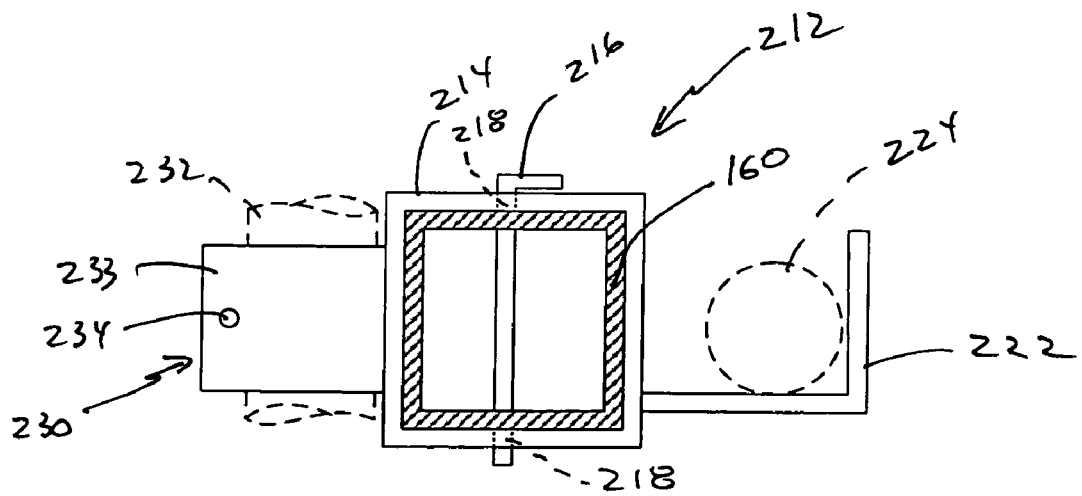

One embodiment of the fixed or adjustable cart connectors includes at least one J-shaped hook 222 that is positioned to receive a portion (e.g., a rail, a frame, etc.) 224 of the lead cart, as shown in FIGS. 6-8. The J-shaped hook 224 can be positioned to receive the portion 224 of the lead cart from above by lifting the portion 224 of the lead cart onto the J-shaped hook 222 or by raising the horizontal support member 160 such that the hooks 222 receive the portion 224 of the lead cart. Alternatively, the J-shaped hooks 222 can be positioned to receive the portion 224 of the lead cart from below by, for example, lowering the horizontal support member 160 until the hooks 222 receive the portion 224 of the lead cart. The J-shaped hooks 222 can also be oriented to receive the portion 224 of the lead cart from the side, such as a vertically oriented portion of the lead cart.

Another embodiment of the fixed or adjustable cart connectors includes a U-shaped hook 230, such as shown in FIGS. 7 and 8, that is configured to receive the portion 232 of the lead cart. The U-shaped hook 230 is best suited for receiving vertically oriented portions 232 of the lead cart, but can be used for horizontally orient portions as well. The U-shaped hook 230 includes a pair of plates 233 and having an aperture 234 through which a pin 236 can be extended to facilitate attachment to the cart portion 232.

In accordance with one embodiment of the adjustable cart connector 212, the J-shaped and/or U-shaped hooks are attached to the sleeve member 214. Another embodiment of the adjustable cart connector 212 includes a J-shaped hook 222 attached the sleeve member 214 and a U-shaped hook 230 attached to the sleeve member 212 on a side that is opposite the J-shaped hook 222, as illustrated in FIGS. 7 and 8.

Another embodiment of the cart connector assembly 110 includes a cable reel 240 attached to the support member 140. The cable reel 240 includes a spindle mounted in a housing 242 to which an end of a cable 244 is connected. The other end 246 of the cable 244 can include a hook 248 (FIG. 1) for attachment to at least one end cart 250 of a row of carts 102 being pulled by the cart collector 100, as illustrated in FIGS. 2 and 3. The housing 242 preferably substantially encloses the spindle and includes an opening 252 through which the cable 244 extends. A manual crank, such as wheel crank 254, is provided to discharge or reel in the cable 244 and adjust the tension in the cable 244. Alternatively, a motorized spindle can be used.

In accordance with one embodiment of the invention, the cart connector assembly 110 includes a cable clamp 256 or other device for locking the cable 244 in a desired position or otherwise limiting the amount of cable 244 that is fed from the reel 240. One embodiment of the cable clamp 256 is positioned rearward of the cable reel 240. The cable 244 extends through the cable clamp 256. The cable clamp 256 includes a release position in which the cable 244 is allowed to travel through the cable clamp 256 and a clamped position in which the cable 244 is prevented from traveling through the clamp 256. A lever arm 258 or other suitable mechanism is used to set the clamp 256 in the release or clamped positions.

In accordance with one embodiment of the invention, the cable reel 240 pivots about the vertical axis 214. As a result of this configuration, very little slack is generated in the cable 244 even during turning maneuvers of a long row of carts 102 since the distance between the end cart 250 and the cable reel 240 stays generally constant.

In accordance with another embodiment of the invention, the cable 244 has a maximum elasticity of approximately 10% elongation that allows it to stretch and retract along with the slight changes in distance between the cable clamp 256 and the end cart 250 of the row being pulled. The elasticity of the cable 244 assists in maintaining a nearly continuous compressive force on the row of carts 102 during cart collecting maneuvers, which allows nested carts to move slightly relative to each other without becoming disengaged.

Some carts 102, such as lumber carts or wheeled pallets, are not configured to nest with other carts of the same type. Another aspect of the present invention is directed to a cart link that is configured to provide a pivotal coupling between such individual carts or carts of different types to generate a chain of carts for pulling by the cart collector 100. Additionally, the cart link can be used to link separate rows of nested carts.

Figure 9:
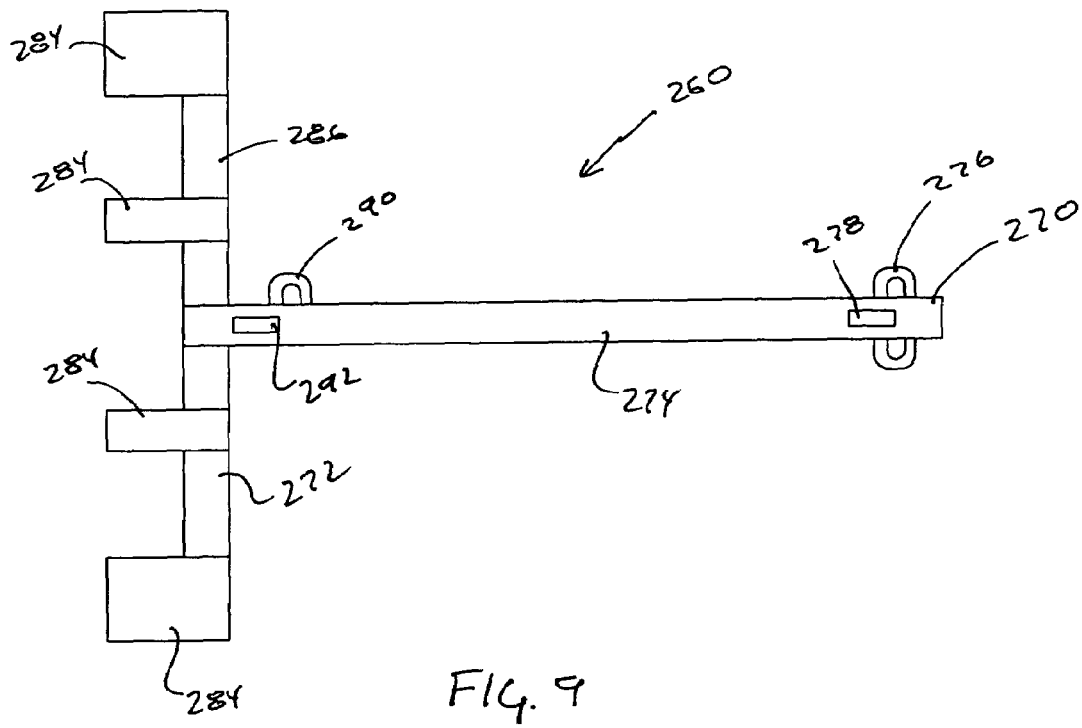
FIGS. 9 and 10 respectively are top and side views of a cart link in accordance with embodiments of the invention.
Figure 10:
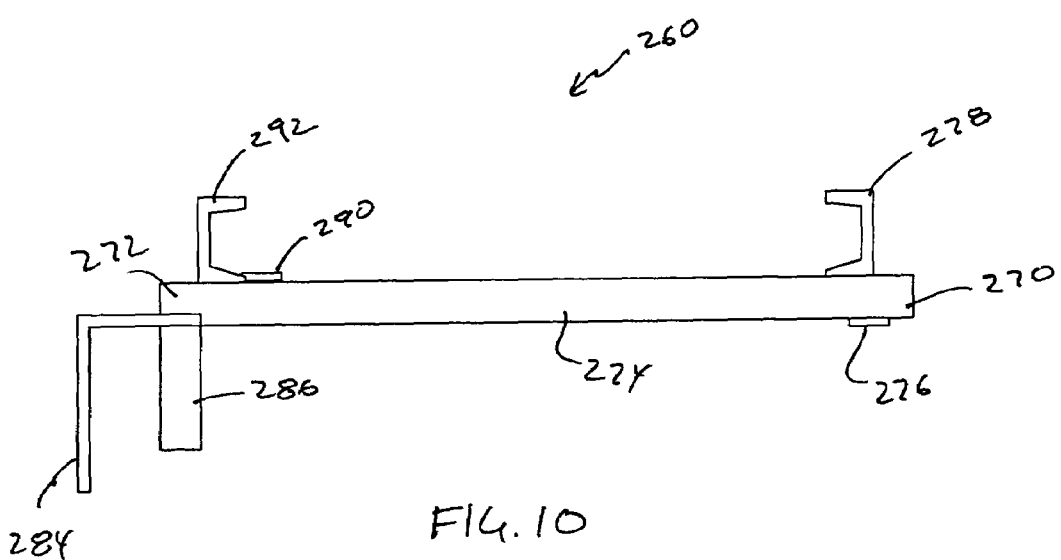
Figure 11:
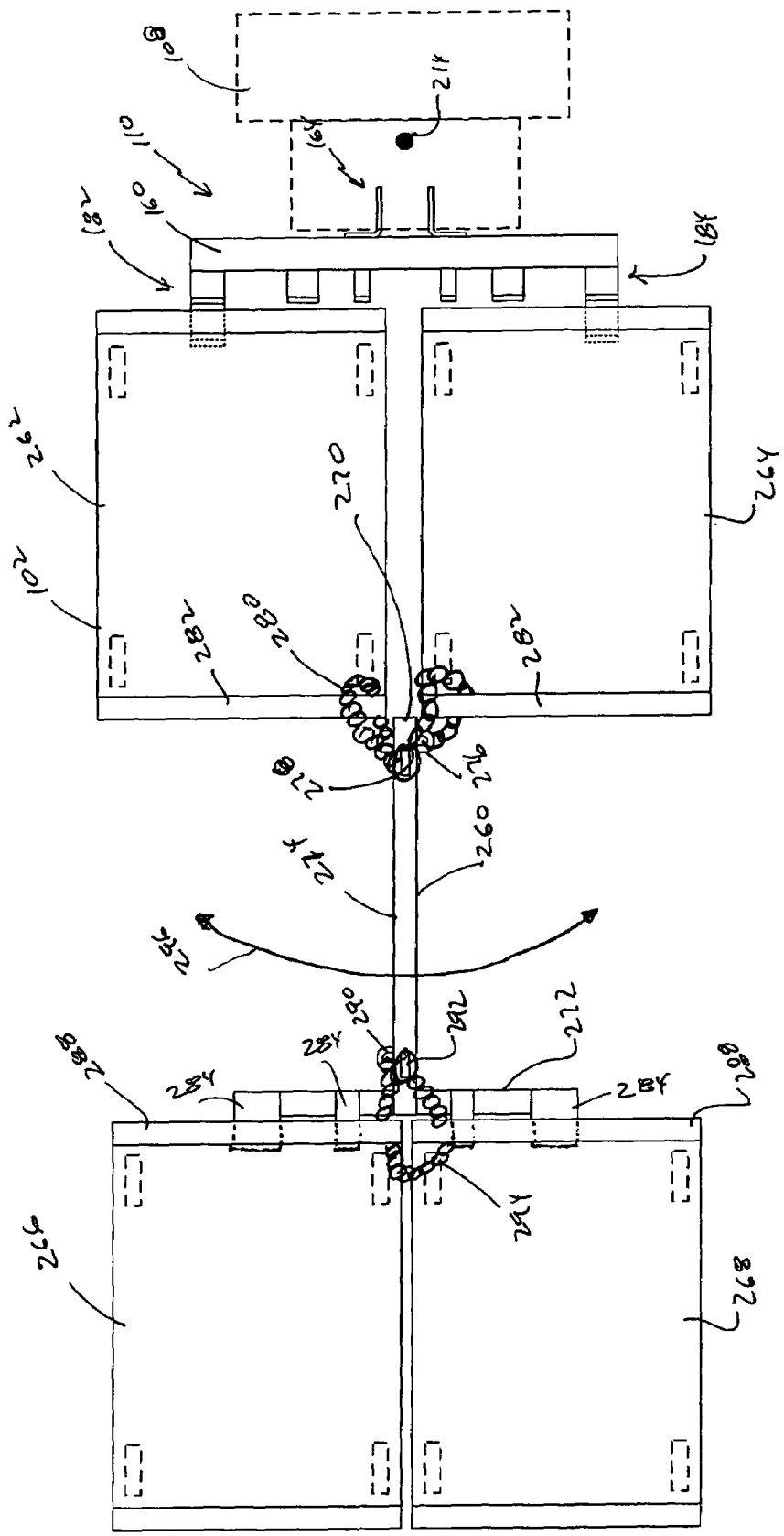
FIG. 11 is a top view of the cart link connected to individual carts in accordance with embodiments of the invention.

FIGS. 9 and 10 respectively are top and side views of a cart link 260 in accordance with embodiments of the invention. FIG. 11 is a top view of the cart link 260 connecting individual carts 262 and 264, which are coupled to the cart connector assembly 110, to carts 266 and 268. Alternatively, as mentioned above, the carts 262 and 264 could be end carts of two rows of carts whose lead carts are attached to the cart connectors 182 and 184 of the cart connector assembly 110 and the carts 266 and 268 could represent the lead carts of another two rows of carts. Additional carts or rows of nested carts can be attached to carts 266 and 268 with another cart link.

In general, the cart link 260 includes first and second ends 270 and 272, each of which is configured to attach to at least one cart 102. The first end 270 is displaced from the second 272 end by a preferably rigid member 274. In accordance with one embodiment of the invention, the first end 270 includes a ring 276 and a hook 278 for receiving ends of a chain or cable 280 which is looped around a portion 282 of at least one of the carts 262 and 264, as shown in FIG. 11. The second end 272 can include one or more cart connectors 284 in the form of J-shaped (shown) and/or U-shaped hooks as discussed above. The cart connectors 284 are mounted to a support member 286 that is transverse to the member 274. Each of the cart connectors 284 is configured to couple to a leading end 288 of one the carts 266 and 268. A ring 290 and hook 292 are provided to receive ends of a chain or cable 294 that is looped through at least one of the carts 266 and 268, as shown in FIG. 11.

The first end 270 of the cart link 260 preferably becomes slightly displaced from the carts 262 and 264 when the cart collector 100 moves in the forward direction 104. This spacing creates a pivot at the first end 270 that allows the second end 272 to rotate about an arc 296. This pivot in combination with the spacing between carts 262 and 264 and the carts 266 and 268 due to the elongate member 274, facilitates easy maneuvering of the chain of carts by the cart collector 100.

Figure 12:
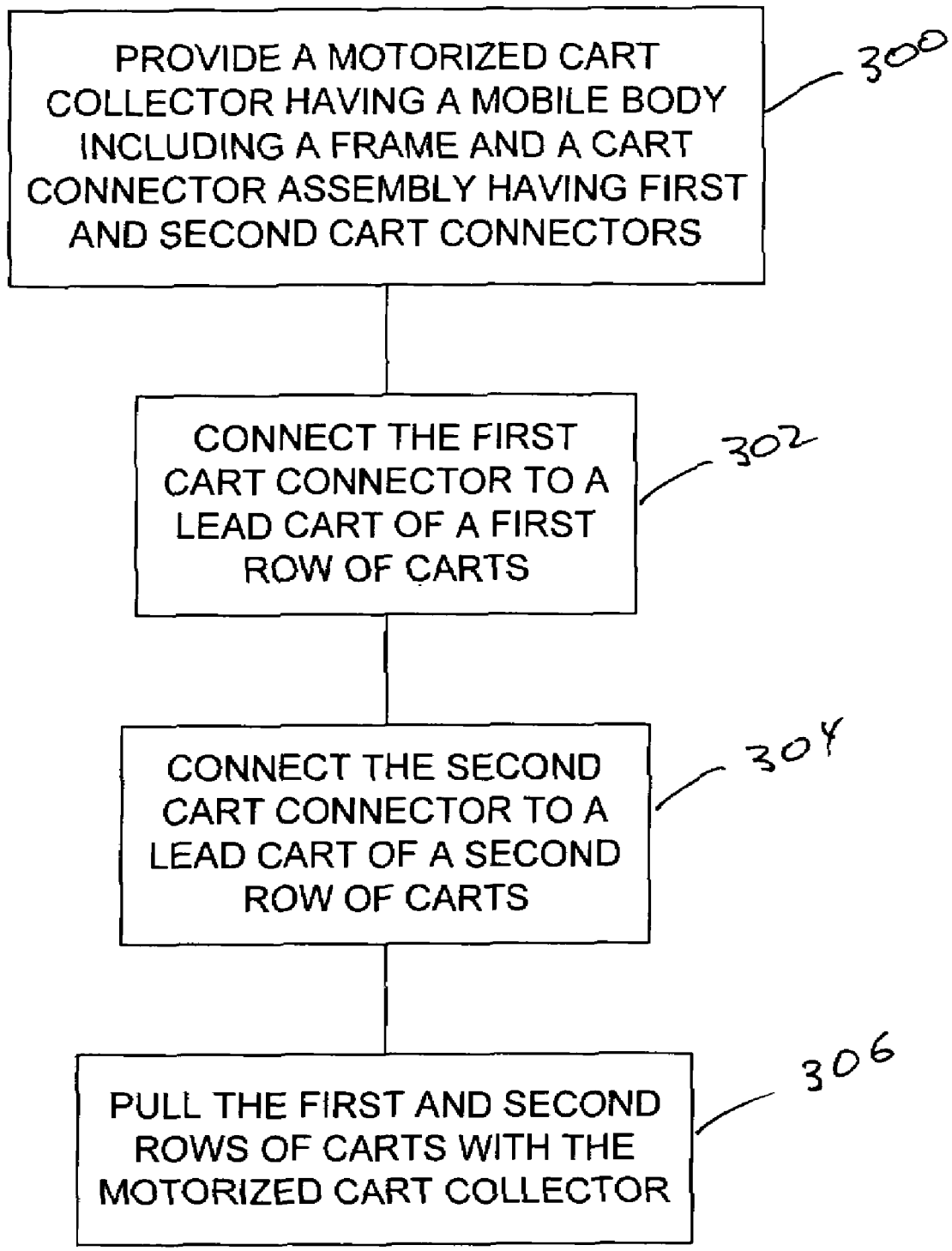
FIG. 12 is a flowchart illustrating a method of pulling two rows of carts in accordance with embodiments of the invention.

Another aspect of the present invention is directed to a method of pulling two rows of carts, which is illustrated in the flowchart of FIG. 12. At step 300 of the method, a motorized cart collector 100 is provided that includes one or more of the embodiments described above. In accordance with one embodiment of the invention, the cart collector 100 includes a mobile body (such as 106), a frame (such as 108) and a cart connector assembly (such as 110) attached to a rear end (such as 112) of the frame that includes first and second cart connectors (such as 182 and 184).

Next, at steps 302 and 304, the first cart connector is connected to a lead cart (such as 186) of a first row of carts (such as 188) and the second cart connector is connected to a lead cart (such as 190) of a second row of carts (such as 192). Finally, at step 306, the first and second rows of carts are pulled with the motorized cart collector.

In accordance with one embodiment of the method, a minimum spacing is limited between leading portions of the lead carts of the first and second rows to a cart separating distance (such as 194). This can be accomplished using, for example, the cart separator 180 described above.

In accordance with another embodiment of the invention, relative movement between the lead and end carts of the first and second rows of carts is limited. This can be accomplished by attaching the cable 144 to the cart connector assembly and the end cart of the first row, as described above.

Yet another embodiment of the method includes providing a cart link (such as 260) that includes first and second ends (such as 170 and 172). In accordance with one embodiment of the invention the relative positions of the first and second ends are fixed. That is, the ends 170 and 172 are joined by a rigid member (such as 274). The first end of the cart link is attached to the end cart (such as 262) of the first row of carts and the second end of the cart link is attached to a lead cart (such as 266) of the third row of carts. A pivot is formed between the end cart of the first row of carts and the lead cart of the third row of carts using the cart link. Finally, the motorized cart collector pulls the first, second and third rows of carts.

In accordance with another embodiment of the invention, the second end of the cart link is attached to a lead cart (such as 268) of a fourth row of carts and the motorized cart collector pulls the first, second, third and fourth rows of carts.

Although the present invention has been described with reference to preferred embodiments, workers skilled in the art will recognize that changes may be made in form and detail without departing from the spirit and scope of the invention. For example, rows of carts as used herein can comprise a single cart that is both the lead cart and the end cart of the row. Additionally, the terms "horizontal" and "vertical" used to describe various support members of the cart connector assembly are intended to provide a general orientation of the support member and should be understood to encompass any support members that are not straight as depicted, but that at least have portions that respectively extend along the horizontal and vertical directions.

What is claimed is:

1. A motorized cart collector for pulling two rows of carts in a forward direction over a surface, the cart collector comprising:
   a mobile body including a frame having a front end, a rear end and a width, wherein the forward direction is toward the front end from the rear end; and
   a cart connector assembly pivotally connected to the rear end of the frame for pivotal movement about a vertical axis that is approximately perpendicular to the surface, the cart connector assembly including a horizontal support member spanning approximately the width of the frame, a cart separator attached to the horizontal support member and having a pair of outside edges displaced along a length of the horizontal support member that define a cart separating distance, and first and second cart connectors each coupled to the horizontal support member on opposing sides of the cart separator and respectively configured to attach to first and second lead carts, wherein the cart separator is configured to maintain at least the cart separating distance between leading portions of the first and second lead carts.

2. The cart collector of claim 1, wherein:
   the cart connector assembly includes a vertical support member having first and second ends, wherein the first end is displaced further from the surface than the second end; and
   the horizontal support member is attached to the vertical support member at a location that is adjustable between the first and second ends.

3. The cart collector of claim 2, wherein the first cart connector is configured for attachment to the horizontal support member at a plurality of locations between a first end of the horizontal support member and the cart separator.

4. The cart collector of claim 3, wherein the second cart connector is configured for attachment to the horizontal support member at a plurality of locations between a second end of the horizontal support member and the cart separator.

5. The cart collector of claim 3, wherein the first cart connector includes a sleeve member through which the horizontal support member extends.

6. The cart collector of claim 5, wherein the first cart connector includes a J-shaped hook member extending from the sleeve member.

7. The cart collector of claim 5, wherein the first cart connector includes a U-shaped hook member attached to the sleeve member and configured to receive a portion of a cart.

8. The cart collector of claim 7, wherein the first cart connector includes a J-shaped hook member extending from the sleeve member.

9. The cart collector of claim 8, wherein the U-shaped hook member and the J-shaped hook member are located on opposing sides of the sleeve member.

10. The cart collector of claim 2, wherein the horizontal support member is attachable to a plurality of predefined locations along the vertical support member between the first and second ends.

11. The cart collector of claim 1 including a cable reel mounted to the cart connector assembly and including a spindle and a cable connected to the spindle.

12. The cart collector of claim 11, wherein the cable reel includes a housing enclosing the spindle and having an aperture through which an end of the cable extends.

13. The cart collector of claim 11 including a cable clamp mounted to the cart connector assembly through which the cable extends, the cable clamp having a release position, in which the cable is allowed to travel through the cable clamp, and a clamped position in which the cable is prevented from traveling through the cable clamp.

14. The cart collector of claim 1, wherein the cart separator includes a pair of cart separating members each including one of the outside edges that define the cart separating distance.

15. The cart collector of claim 14, wherein the first and second cart separating members each include a J-shaped hook member.

16. The cart collector of claim 1, wherein the cart separating distance is greater than approximately 3 inches.

17. The cart collector of claim 1, wherein the first and second cart connectors each include at least one of a J-shaped hook and a U-shaped hook.

18. A motorized cart collector for pulling two rows of carts in a forward direction over a surface, the cart collector comprising:
   a mobile body including a frame having a front end and a rear end, wherein the forward direction is toward the front end from the rear end; and
   a cart connector assembly pivotally connected to the rear end of the frame for pivotal movement about a vertical axis that is approximately perpendicular to the surface, the cart connector assembly including first and second cart connectors respectively configured to simultaneously attach to first and second lead carts.

19. The cart collector of claim 18 including a cart separator having a pair of outside edges that define a cart separating distance, wherein the cart separator is configured to maintain at least the cart separating distance between leading portions of the first and second lead carts.

20. The cart collector of claim 19, including a horizontal support member, wherein the first cart connector, the second cart connector and the cart separator are each attached to the horizontal support member.

21. The cart collector of claim 20, wherein the first cart connector is configured for attachment to the horizontal support member at a plurality of locations between a first end of the horizontal support member and the cart separator.

22. The cart collector of claim 18, wherein the first and second cart connectors include positions that are vertically and horizontally adjustable relative to the frame.

23. The cart collector of claim 18, wherein the first and second cart connectors include at least one of a J-shaped hook and a U-shaped hook.

24. The cart collector of claim 18 including a cable reel mounted to the cart connector assembly and including a spindle and a cable connected to the spindle.

25. A method of pulling two rows of carts comprising steps of:
providing a motorized cart collector configured to pull carts in a forward direction over a surface, the cart collector including a mobile body having a frame and a cart connector assembly attached to a rear end of the frame and including first and second cart connectors;
connecting the first cart connector to a lead cart of a first row of carts;
connecting the second cart connector to a lead cart of a second row of carts; and
pulling the first and second rows of carts with the motorized cart collector.

26. The method of claim 25 including limiting relative movement between the lead and end carts of the first and second rows of carts.

27. The method of claim 26, wherein the limiting step includes attaching a cable from the cart connector assembly to at least one of the end carts of the first and second rows of carts.

28. The method of claim 25 including:
providing a cart link comprising first and second ends;
attaching the first end of the cart link to the end cart of the first row of carts;
attaching the second end of the cart link to a lead cart of a third row of carts;
forming a pivot between the end cart of the first row of carts and the lead cart of the third row of carts using the cart link; and
pulling the first, second and third rows of carts with the motorized cart collector.

29. The method of claim 28, wherein:
attaching the second end of the cart link to a lead cart of a fourth row of carts; and
pulling the first, second, third and fourth rows of carts with the motorized cart collector.

* * * * *